Jan. 24, 1956  E. S. McKEE  2,731,895
BLADE AND COVER BLIND SHUTTER
Filed Oct. 25, 1954  4 Sheets-Sheet 4
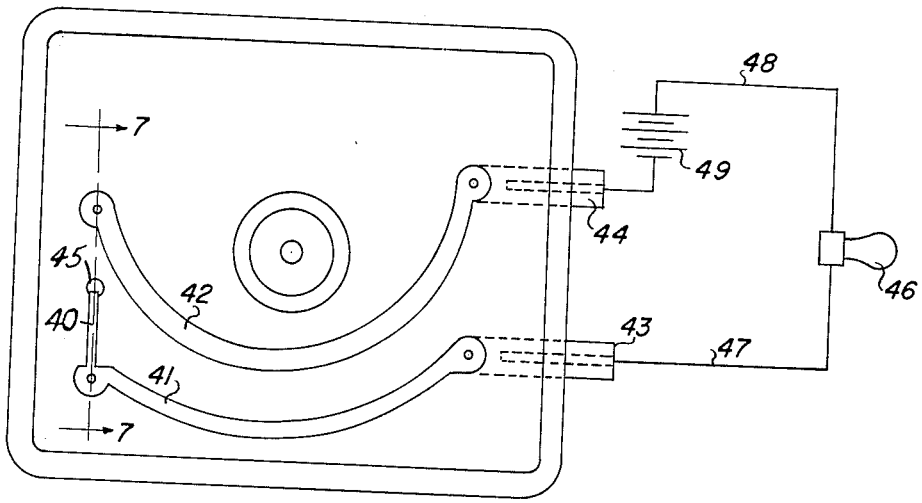
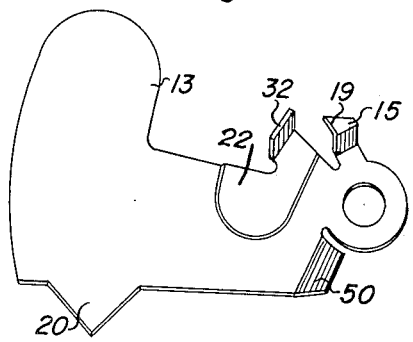
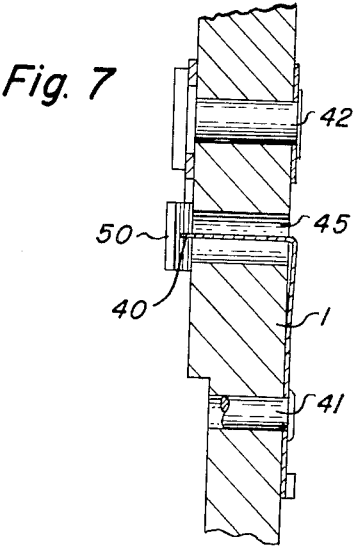
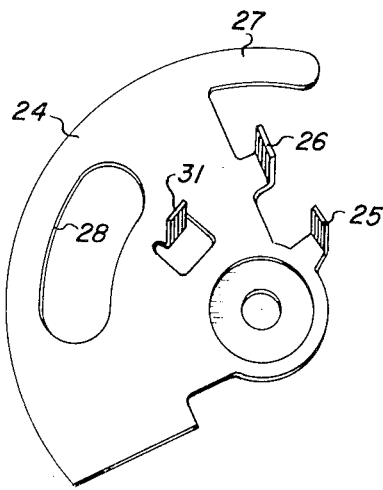
EDWARD S. McKEE
INVENTOR.
BY Daniel I. Mayne
Donald H. Stewart
ATTORNEYS

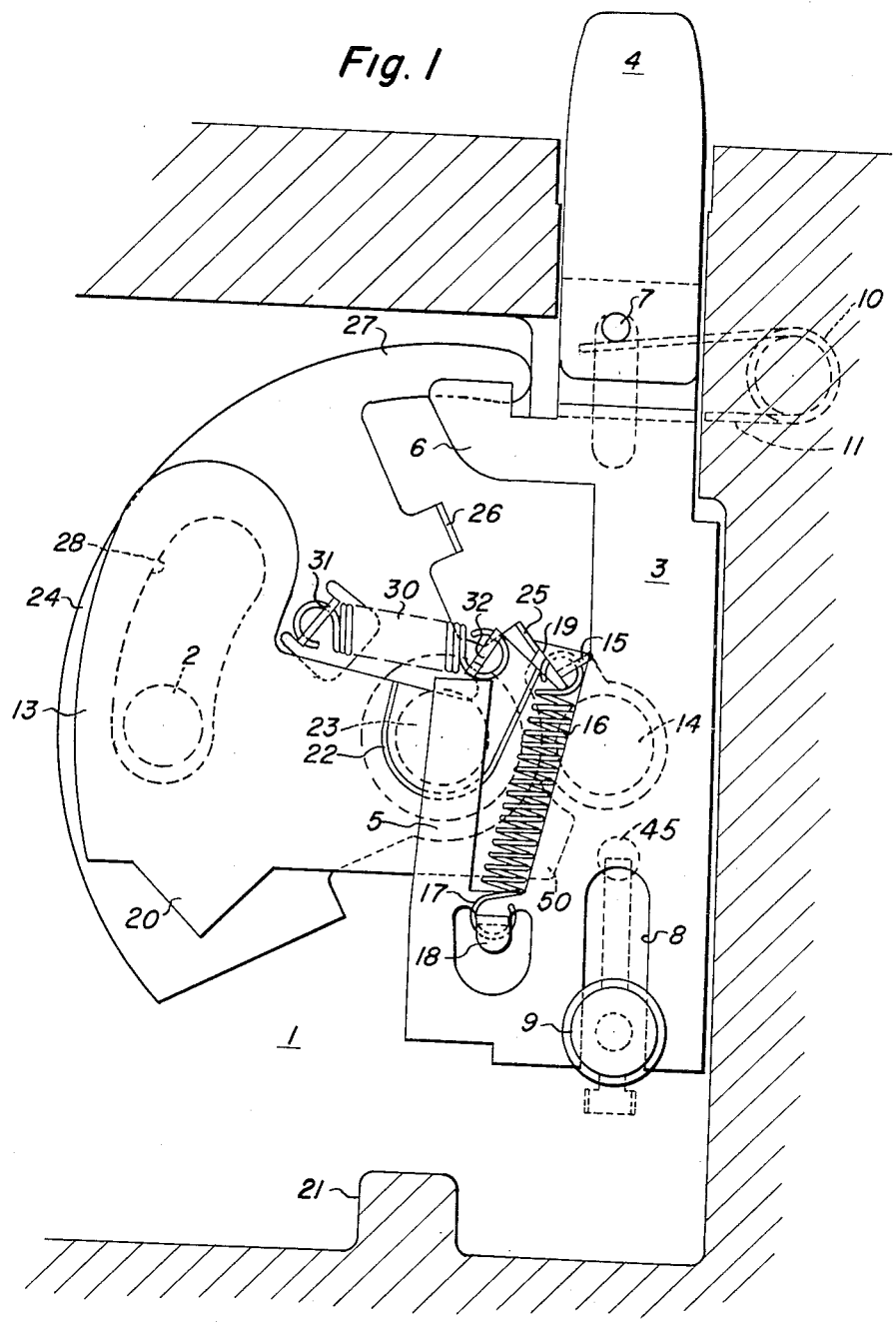

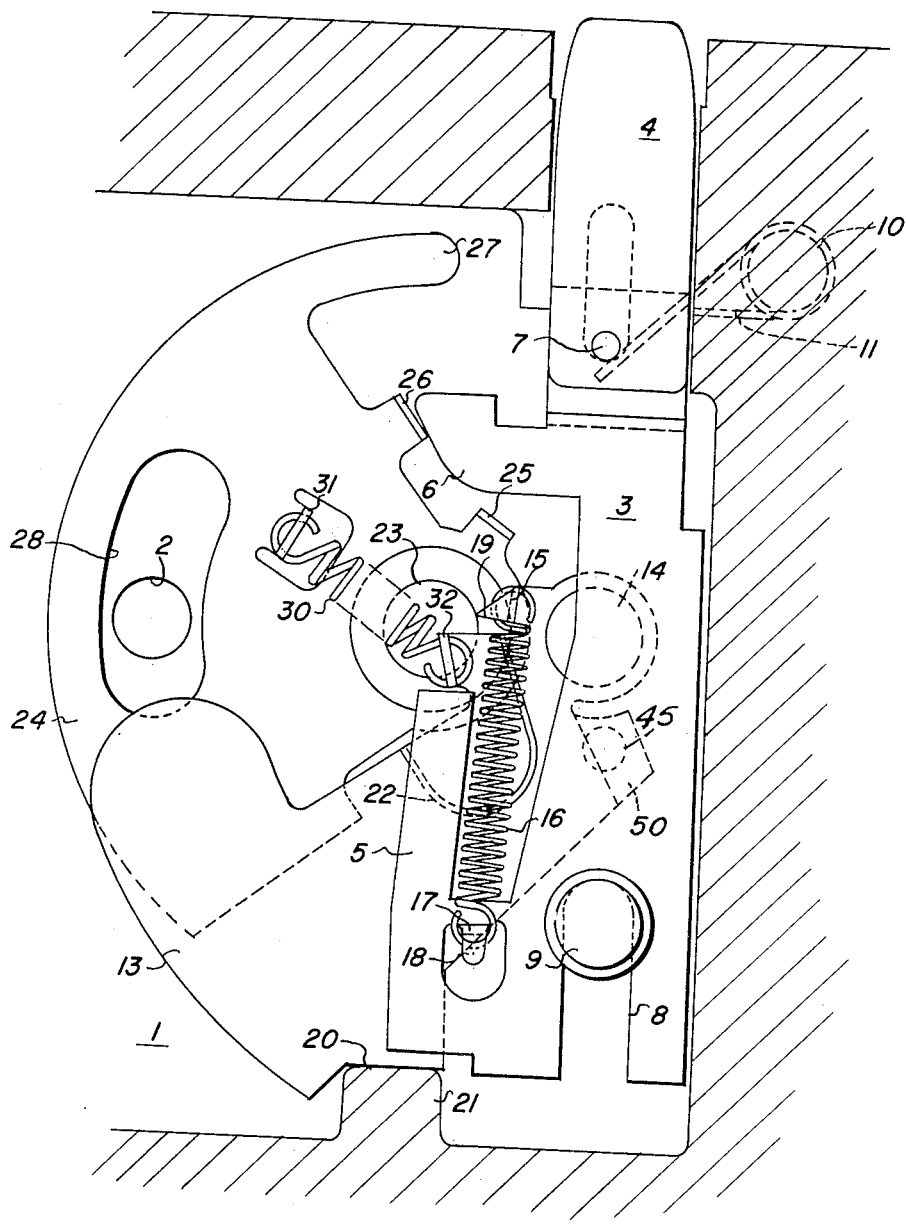

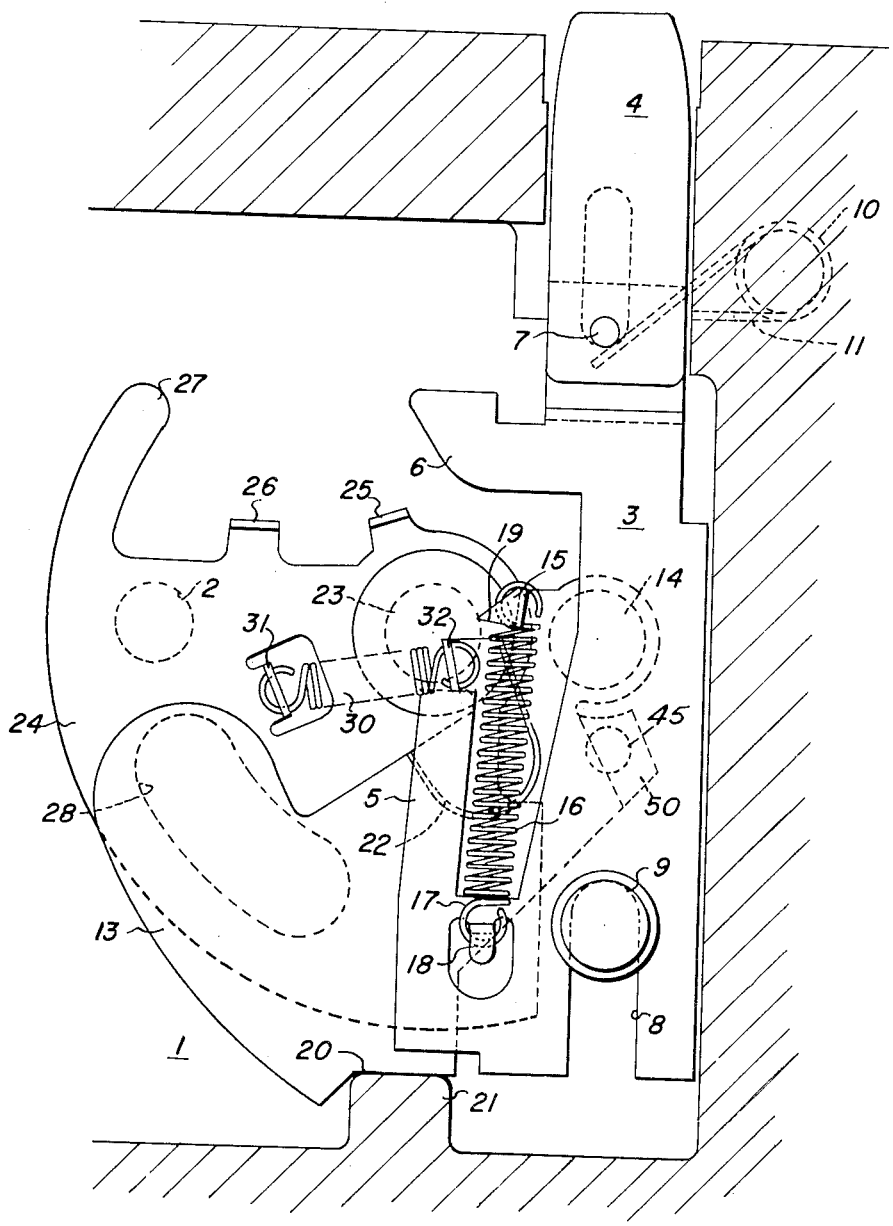

United States Patent Office 2,731,895
Patented Jan. 24, 1956

2,731,895
BLADE AND COVER BLIND SHUTTER

Edward S. McKee, Rochester, N. Y., assignor to Eastman Kodak Company, Rochester, N. Y., a corporation of New Jersey Application October 25, 1954, Serial No. 464,379

2 Claims. (Cl. 95—60)

This invention relates to photography and more particularly to camera shutters.

It is difficult to provide a camera shutter at a modest cost which is sufficiently accurate in exposure time to produce uniform results with high speed films and particularly color films. Black-and-white films have considerable latitude but most color films must be accurately exposed for good results. Many inexpensive shutters do not repeat exposures with even a fair degree of accuracy, some exposures being much faster than others. Other shutters may even vary in speed with the speed of depression of the trigger.

One object of my invention is to provide an inexpensive shutter mechanism capable of making repeated exposures of the same or very nearly the same duration. Another object is to provide a shutter in which the parts are few and are simple to assemble. Another object is to provide an accurate, relatively slow speed of say 1/40 of a second. Another object is to provide a shutter in which the speeds are entirely independent of the trigger speed. A further object is to provide a shutter of the so-called shutter blade and cover blind type. Other objects will appear in the following specification, the novel features being pointed out in the claims at the end thereof.

Coming now to the drawings wherein like reference characters denote like parts throughout:

Fig. 1 is a rear elevation of a preferred embodiment of a typical shutter constructed in accordance with my invention showing the shutter parts in a normal position of rest which they assume before and after an exposure has been made. Certain parts have been broken away for clearness;

Fig. 2 is a view similar to Fig. 1 but with the shutter parts in a position which they pass through in making an exposure;

Fig. 3 is a view similar to the preceding figures with the shutter parts in the position they assume at the end of an exposure before the shutter trigger has been released;

Fig. 4 is a perspective view of a cover blind before being assembled into a camera;

Fig. 5 is a perspective view of a shutter blade before being assembled into a camera;

Fig. 6 is a front plan view of a shutter with certain parts removed and with a part of the flash switch shown in a normal position of rest; and Fig. 7 is a section on line 7—7 of Fig. 6.

In the preferred embodiment of my invention I have shown a shutter consisting of but few and simple parts, each part of which moves through its cycle in a predetermined relationship to each of the other parts, the shutter being of the so-called automatic type in that no separate setting is required before an exposure is made.

The preferred embodiment shows that the shutter may be assembled on a support 1, this support may be a suitable plate such as of metal or plastic, which plate carries an exposure aperture 2. There is a trigger 3 movable through a fixed path on the support, here shown as a sliding member which may be provided with a decorative handle 4 which is preferably pivoted to the trigger 3 by means of a suitable pivot 7. The trigger is slotted at 8 to slidingly engage a supporting stud 9 and is spring held in its position of rest by means of a spring 10 having one end engaging the support 11 and the opposite end engaging the pivot pin 7. Thus the spring tends to hold the trigger in its raised position as shown. The trigger is also provided with two off-set arms, one arm being a pusher arm 5 and the other arm 6 providing a cam surface for releasing the cover blind, as will be hereinafter more fully described.

The exposure aperture 2 is normally covered by a cover blind 13 pivoted at 14 to the support 1 and including a lug 15 holding an end of a cover blind spring 16, the other end 17 of which is attached to a lug 18 on the trigger 3. The cover blind lug 15 may constitute a latch element through its straight edge 19 and there is a stop lug 20 on the cover blind adapted to rest against a stop 21 carried by the support 1 when an exposure has been completed as shown in Fig. 3. There is an offset portion 22 on the cover blind which lies over the top of a pivot 23 on which the shutter blade 24 is mounted. This shutter blade includes a latch element 25, an upstanding lug 26 and a stop arm 27 which positions the cover blind in a rest position as shown in Fig. 1. The shutter blade 24 includes an exposure slot 28 which normally lies over the aperture 2 so that in its position of rest the shutter blade 24 does not exclude light from the aperture 2 but light is excluded by means of the cover blind 13. There is a shutter blade spring 30 attached to a lug 31 on the shutter blade and a lug 32 on the cover blind.

The movement of the parts in making an exposure is as follows. When the handle 4 of the trigger is pressed downwardly, the trigger 3 moves downwardly against the action of the trigger spring 10. As the trigger descends, the pusher arm 5 moves away from the lug 32 but the cover blind 13 cannot move an appreciable distance because of the latch elements 19 and 25 which hold the cover blind against movement unless the shutter blade 24 is moved. Consequently, as the trigger moves down, the cover blind spring 16 is tensioned and this tension must reach a predetermined degree before an exposure can be made for the following reasons. The latch releasing cam 6 on the trigger moves downwardly as the trigger is depressed and the cam surface 6 engages the lug 26 after the trigger has moved down some distance, a distance sufficient to space the pusher arm 5 from the cover blind lug 32. When this engagement occurs, the shutter blade 24 is turned in a counterclockwise direction with respect to Fig. 1. This turning movement moves the latching lug 25 away from the latching member 19 and since the cover blind spring 16 has been tensioned to a predetermined degree by the downward movement of the trigger, the cover blind may move in a counterclockwise direction the instant the latch elements 25 and 19 separate. Thus there is always an equal thrust on the trigger 3 and an equal pull on the cover blind 13 by spring 16 and the cover blind 13 will move quickly about its pivot 14 after it has been released by the shutter blade. This tensions the shutter blade spring 30 and by pulling the end of the spring across the shutter blade pivot 23, the shutter blade now moves after the cover blind has been removed from the exposure aperture 2, as is indicated in Fig. 2.

Continued movement of the shutter blade closes the exposure aperture 2, as shown in Fig. 3, and the parts have reached the position shown in this view where they will remain only so long as an operator holds the trigger handle 4 in a depressed position. As soon as the handle 4 is released, the spring 10 overcomes the remaining springs and raises the trigger 3 to its Fig. 1 position. At this time there is but little tension on the cover blind spring 16 and the shutter blade spring 30 but nevertheless the returning movement of the trigger 3 causes the cover blind, shutter blade and latch elements 19 and 25 to engage so that these parts are now held in their Fig. 1 position ready for a second actuation.

As indicated in Figs. 6 and 7, a cam on the cover blind may actuate a flash switch when it swings to its Fig. 2 position, this flash switch comprising a spring arm 40 connected to a connector 41 connected to terminal 43. There is a second connector 42 connected to a second terminal 44. The spring switch arm 40 extends through an aperture 45 in the support 1 and into the path of a cover blind cam 50 so that each time the cover blind is depressed, this switch arm may be engaged and moved slightly into a firm contact to close a circuit through the connectors 41, 42, the terminals 43, 44 and a flash lamp shown diagrammatically at 46 as being connected through connectors 47 and 48 through a battery 49. Since the cam 50 of the cover blind 13 is used to close the flash switch, the switch is closed as the cover blind reaches its Fig. 2 position while the shutter blade is still exposing the exposure aperture 2. Since it may take approximately 1/40 of a second for the exposure aperture to close, this interval of time is sufficient for any of the well-known types of flash lamps to be synchronized for use with this shutter.

While I have described a preferred embodiment of my invention and one which is well suited for production, there are numerous changes which can readily be made without departing from my invention. For instance, the trigger may be made in one piece with the handle and trigger a single metal strip. In the embodiment illustrated a decorative plastic handle 4 is pivoted to the trigger 3 to facilitate assembling and for decorative purposes.

The essential parts, the trigger 3, the cover blind 13 and the shutter blade 24, all move through a predetermined path of movement in making an exposure and in the preferred embodiment illustrated, this path of movement is sliding with regard to the trigger 3, and swinging about studs with regard to the cover blind 13 and shutter blade 24. It is obvious, however, that the exact paths of movement of the various parts can be altered to suit the particular camera on which the shutter is to be applied. I consider as within the scope of my invention all such changes as may come within the scope of the appended claims.

Having thus described my invention what I claim as new and desire to secure by Letters Patent of the United States is:

1. A shutter for cameras, comprising an aperture in the support, a trigger mounted on the support to move through a path, a trigger spring normally holding the trigger in a rest position, a cover blind mounted to move through a path and having a rest position covering the aperture, a lug on the cover blind, a pusher arm carried by the trigger normally pressing against the lug and holding the cover blind in its rest position and adapted to engage the lug at all times except during depression of the trigger for making an exposure, a cover blind spring attached to the cover blind and the trigger adapted to be tensioned by moving the trigger on the support, a shutter blade having a rest position uncovering the aperture and movable on the support between an aperture uncovering position and an aperture covering position, a shutter blade spring connecting the shutter blade and the cover blind adapted to be tensioned and released by the cover blind, the trigger spring being of sufficient strength to return the cover blind and with it the shutter blade to their rest positions, a latching lug on the cover blind, a latching lug on the shutter blade, said lugs engaging as the cover blind and shutter blade reach their rest positions whereby the latching lug on the shutter blade holds the latching lug on the cover blind against movement, a cam on the trigger, said latching lugs being released by the cam of the trigger moving the shutter blade as the trigger is moved to tension the cover blind spring to a predetermined tension, the cover blind moving in advance of the shutter blade as the latching lugs are released whereby the cover blind may tension the shutter blade spring to move the shutter blade to close the exposure aperture after it has been opened by the cover blind.

2. A shutter for cameras, comprising a support having an aperture therein, a trigger movable on the support, a cover blind movable on the support to uncover and cover the aperture, a shutter blade movable on the support to cover and uncover the aperture, spring connections between the trigger and cover blind and the cover blind and shutter blade, a latch between the cover blind and shutter blade for holding the former by the latter whereby the trigger may be moved to tension the spring between the trigger and cover blind while the latter is held against movement by the latch, and means on the trigger for engaging the shutter blade moving said blade to release the latch whereby the cover blind may move, said movement of the cover blind tensioning the spring connecting the cover blind and shutter blade operating the shutter blade after the cover blind is moved by the spring connecting the trigger and the cover blind.

References Cited in the file of this patent

UNITED STATES PATENTS 2,443,164    Harvey _____ June 8, 1948